Patented Apr. 7, 1925.

1,532,790

UNITED STATES PATENT OFFICE.

MAX WEILER, OF ELBERFELD, GERMANY, ASSIGNOR TO FARBENFABRIKEN VORM. FRIEDR. BAYER AND CO., OF LEVERKUSEN, NEAR COLOGNE-ON-THE-RHINE, GERMANY.

PYRONE DYE.

No Drawing.    Application filed February 1, 1924.   Serial No. 690,087.

*To all whom it may concern:*

Be it known that I, MAX WEILER, a citizen of Germany, residing at Elberfeld, in the State of Prussia, Germany, have invented new and useful Improvements in Pyrone Dyes, of which the following is a specification.

The present invention relates to the manufacture and production of new and valuable dyestuffs of the pyrone series capable of being chromed after dyeing and which in the shape of either their leucocompounds or the dyestuffs themselves can be further sulfonated. They have most probably the following general formula:

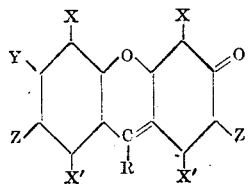

in which X includes hydrogen, alkyl and the carboxylic group; Y and X' include hydrogen and the hydroxy group; Z includes hydrogen and the carboxylic group, and R represents an aromatic nucleus.

The new dyes are after being dried and pulverized generally red to yellow to greenish-black powders generally scarcely soluble in water but generally easily soluble in water after sulfonation. In dilute caustic soda lye they are generally easily soluble with a yellow to red coloration.

They dye wool from acid baths from yellow-orange to red and after chroming from red-orange to brown-red shades fast to alkali, fulling and potting.

The process for their production consists in condensing 2.4-dihydroxybenzoic acid compounds or their mixtures with aromatic aldehydes substituted in ortho-position to the carbonyl group or such aldehydes as contain neither substituents in ortho-position nor an hydroxy group in ortho- or para-position to the carbinol carbon atom and oxidizing the resulting leucocompounds respectively sulfonating these leucocompounds or the dyestuffs themselves in the usual manner.

In order to illustrate my new process more fully the following example is given, the parts being by weight:—

15 parts of 2.6-dichlorbenzaldehyde and 28 parts of 2.4-dihydroxy-3-methylbenzoic acid (obtained by carbonization of 2.6-dihydroxytoluene melting point 206–207° C.) are dissolved in a strong sulfuric acid and stirred until both components are almost completely converted into the leuco acid. The melt is poured on ice and the leuco acid which separates is filtered off. It is almost insoluble in water and gives with ferric chloride a reddish-blue coloration. For the production of the dyestuff it is not necessary to isolate the leuco acid but use the melt directly. For this purpose 7 parts of sodium nitrite, if necessary after an addition of sulfuric acid (100 per cent), are introduced into the melt and it is stirred until the formation of the dyestuff is complete. The melt is then poured on ice and the dyestuff thus obtained in the form of a red powder is filtered off.

The new dye is after being dried and pulverized a brown powder soluble with great difficulty in hot water with a red-orange coloration but easily soluble in caustic soda solution or sodium carbonate with a scarlet coloration and a strong fluorescence. In concentrated sulfuric acid a yellow solution is obtained. It has most probably the formula:

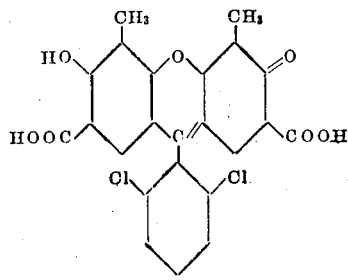

The shades on wool from an acid bath are scarlet, when after treated with chrome-mordants they turn to an intense purple. Other oxidizing agents can also be used.

The above mentioned aldehyde may be replaced by other aldehydes, such as benzaldehyde, ortho-sulfobenzaldehyde, ortho-chlorobenzaldehyde, 2-chloro-5-sulfobenzaldehyde, 2.6-dichloro-3-hydroxybenzaldehyde, 2.4.6-trichloro-3-hydroxybenzaldehyde, 2-chloro-4-diethylaminobenzaldehyde. 1.3-dichloro-2-anthraquinonealdehyde, meta-chlorobenzaldehyde, para-chlorobenzaldehyde, 4-chloro-3-sulfobenzaldehyde, para-nitrobenzaldehyde, para-diethylaminobenzaldehyde, etc.

Instead of the 3-methyl-2.4-dihydroxybenzoic acid, other 2.4-dihydroxybenzoic acids can be used.

The introduction of sulfuric acid groups in the leucocompound or in the dyestuff itself is for example performed as follows: 8.2 parts of the dried leuco acid (see example) are dissolved in 80 parts of sulfuric acid (100 per cent) and 20 parts of fuming sulfuric acid (65 per cent) are added to it. The liquid is stirred until a sample of the isolated leuco acid is easily and completely soluble in water. The leuco acid gives with ferric chloride a blue-violet coloration. For the conversion of this leuco acid into its dyestuff the compound is diluted with a small quantity of ice or sulfuric acid (60° Bé). 1.7 parts of sodium nitrite are then added and afterwards stirred under a moderate heating until the formation of the dyestuff is finished. The melt is poured on ice and common salt. The isolated dyestuff is easily soluble in water and dyes wool from an acid bath a scarlet shade, afterchromed it turns into an intense purple shade. It can also be used for printing. In an analogous manner a sulfuric acid group can also be introduced in the dyestuff itself in which case a greater quantity of fuming sulfuric acid is necessary. The dyestuff thus obtained has the formula:

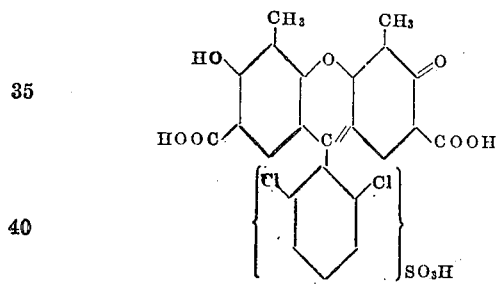

I claim:—

1. The herein described new dyestuffs of the pyrone series having most probably the following general formula:

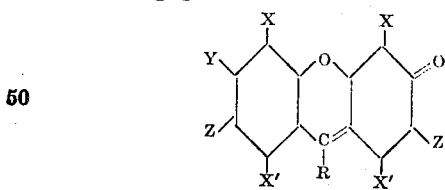

in which X includes hydrogen, alkyl and the carboxylic group; Y and X' include hydrogen and the hydroxy group; Z includes hydrogen and the carboxylic group and R represents an aromatic nucleus, which dyestuffs are, after being dried and pulverized, generally red to yellow to green-black powders, generally scarcely soluble in water but sometimes easily soluble in water as sulfonic acids, easily soluble in dilute caustic soda solution, partly with a strong fluorescence with a yellow to red coloration, dyeing wool from acid baths from yellow-orange to brown and after chroming from red-orange to brown-red shades fast to alkali, fulling and to potting, substantially as described.

2. The herein described new pyrone dye having the formula:

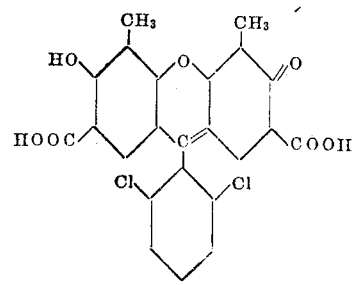

which is after being dried and pulverized a brown powder soluble with great difficulty in hot water with a red-orange coloration and easily soluble in caustic soda solution with a scarlet coloration and a strong fluorescence; dyeing wool from acid bath scarlet and afterchromed an intense purple shade, substantially as described.

3. The herein described new pyrone dye having the formula:

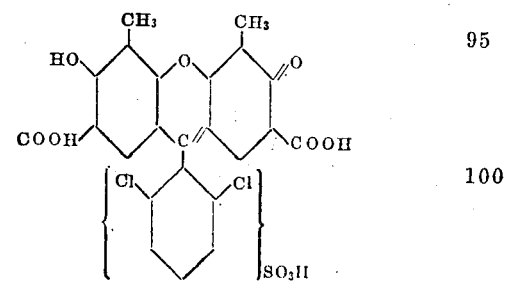

which dye is after being dried and pulverized a brown powder easily soluble in water with an orange coloration and likewise soluble in caustic soda solution with a scarlet coloration; dyeing wool from acid bath scarlet and afterchromed an intense red shade, substantially as described.

In testimony whereof I have hereunto set my hand.

MAX WEILER.